(12) United States Patent
Guo et al.

(10) Patent No.: US 11,273,884 B2
(45) Date of Patent: Mar. 15, 2022

(54) BICYCLE FRAME

(71) Applicant: SABIC GLOBAL TECHNOLOGIES B.V., Bergen Op Zoom (NL)

(72) Inventors: Jing Guo, Geleen (NL); Maria Soliman, Geleen (NL); Mahari Tjahjadi, Geleen (NL); Chaodong Jiang, Geleen (NL); Christelle Marie Helene Grein, Geleen (NL); Ratnesh Khandelwal, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 17/271,807

(22) PCT Filed: Aug. 29, 2019

(86) PCT No.: PCT/EP2019/073073
§ 371 (c)(1),
(2) Date: Feb. 26, 2021

(87) PCT Pub. No.: WO2020/048862
PCT Pub. Date: Mar. 12, 2020

(65) Prior Publication Data
US 2021/0309316 A1    Oct. 7, 2021

(30) Foreign Application Priority Data
Sep. 5, 2018  (EP) ..................... 18192694

(51) Int. Cl.
| | |
|---|---|
| B62K 19/16 | (2006.01) |
| B29B 9/06 | (2006.01) |
| B29B 9/14 | (2006.01) |
| B29C 45/00 | (2006.01) |
| C08J 5/04 | (2006.01) |
| C08K 7/14 | (2006.01) |
| B29K 23/00 | (2006.01) |
| B29K 309/08 | (2006.01) |
| B29L 31/30 | (2006.01) |

(52) U.S. Cl.
CPC ............... B62K 19/16 (2013.01); B29B 9/06 (2013.01); B29B 9/14 (2013.01); B29C 45/0005 (2013.01); C08J 5/043 (2013.01); C08K 7/14 (2013.01); *B29C 2045/0091* (2013.01); *B29K 2023/12* (2013.01); *B29K 2309/08* (2013.01); *B29L 2031/3091* (2013.01); *C08J 2323/12* (2013.01)

(58) Field of Classification Search
CPC ....... B62K 19/16; B29B 9/06; B29C 45/0005; C08J 5/043; C08K 7/14
See application file for complete search history.

(56) References Cited

U.S. PATENT DOCUMENTS

| | | | |
|---|---|---|---|
| 8,637,598 B2 | 1/2014 | Bernd et al. | |
| 9,422,024 B2 | 8/2016 | Al-Sheyyab et al. | |
| 2017/0341268 A1 | 11/2017 | Soliman et al. | |
| 2018/0194909 A1 | 7/2018 | Kanuteh et al. | |
| 2019/0338112 A1* | 11/2019 | Lummerstorfer | ........ C08J 5/042 |

FOREIGN PATENT DOCUMENTS

| | | |
|---|---|---|
| CN | 102059768 A | 5/2011 |
| CN | 104097727 A | 10/2014 |
| EP | 1364760 A1 | 11/2003 |
| EP | 2740657 A1 | 11/2014 |
| JP | H05177629 A | 7/1993 |
| NL | 1010646 C2 | 11/1999 |
| WO | 9900543 A1 | 1/1999 |
| WO | 2009080821 A2 | 7/2009 |
| WO | 2016174323 A1 | 11/2016 |

OTHER PUBLICATIONS

International Search Report; International Application No. PCT/EP2019/073073; International Filing Date: Aug. 29, 2019, dated Dec. 2, 2019; 6 pages.
Written Opinion; International Application No. PCT/EP2019/073073; International Filing Date: Aug. 29, 2019, dated Dec. 2, 2019; 6 pages.

* cited by examiner

*Primary Examiner* — Stella K Yi
(74) *Attorney, Agent, or Firm* — Cantor Colburn LLP

(57) ABSTRACT

The invention relates to a bicycle frame made by injection molding pellets of a long glass fibre reinforced polypropylene composition having a core containing glass fibres and an impregnating agent and a sheath of polypropylene surrounding said core, wherein the pellets have an average length of at least 1 mm, the amount of the glass fibers is 10 to 70 wt % with respect to the composition and the polypropylene has a flexural modulus determined according to ASTM D790A of at least 1000 N/mm$^2$.

17 Claims, No Drawings

BICYCLE FRAME

CROSS REFERENCE TO RELATED APPLICATIONS

This application is a national stage application of International Application No. PCT/EP2019/073073, filed Aug. 29, 2019, which claims priority to European Application Serial No. 18192694.0, filed Sep. 5, 2018, both of which are incorporated by reference in their entirety.

The present invention relates to a bicycle frame made by injection molding.

It is known to manufacture bicycle frames from metal or from duroplastic, fiber-reinforced material. There have been some attempts in the past to produce bicycle frames entirely from thermoplastic material by way of a plastics injection-molding process. While corresponding cycle times here undercut those of a duroplastic bicycle frame by orders of magnitude, however, on account of the modest maximum wall thicknesses (a few centimeters or millimeters) which can be achieved in the plastics injection-molding process, the mechanical properties of such bicycle frames are insufficient.

U.S. Pat. No. 9,422,024 discloses a method for manufacturing a bicycle frame using partly a plastics injection-moulding process. The bicycle frame is formed by a half-shell made of a thermoplastic material. The half-shell is fiber-reinforced at least in regions, and includes a cover element, which is, at least in regions, connected to the half-shell and preferably closes the half-shell.

It is an objective of the present invention to provide a bicycle frame made by injection molding a thermoplastic composition. The suitability of the bicycle frame can be verified e.g. according to ISO4210-6:2014.

Accordingly, the invention provides a bicycle frame made by injection molding pellets of a long glass fibre reinforced polypropylene composition having a core containing glass fibres and an impregnating agent and a sheath of polypropylene surrounding said core, wherein the pellets have an average length of at least 1 mm, the amount of the glass fibers is 10 to 70 wt % with respect to the composition and the polypropylene has a flexural modulus determined according to ASTM D790A of at least 1000 N/mm$^2$.

It was surprisingly found that such bicycle frame has a combination of desirable mechanical properties to satisfy the requirements of ISO4210-6:2014.

A long glass fibre reinforced polypropylene composition having a core containing glass fibres and an impregnating agent and a sheath of polypropylene surrounding said core as required in the present invention is commercially available as pellets from SABIC Innovative Plastics under the brand name Stamax.

Methods for the manufacture of such materials are known in the prior art.

For example, WO 2009/080281 discloses a method for the manufacture of said type of long glass fibre reinforced polypropylene materials. That method comprises the subsequent steps of:

a) unwinding from a package of at least one continuous glass multifilament strand containing at most 2% by mass of a sizing composition;

b) applying from 0.5 to 20% by mass of an impregnating agent to said at least one continuous glass multifilament strand to form an impregnated continuous multifilament strand;

c) applying a sheath of thermoplastic polymer around the impregnated continuous multifilament strand to form a sheathed continuous multifilament strand;

characterised in that the impregnating agent is non-volatile, has a melting point of at least 20° C. below the melting point of the thermoplastic matrix, has a viscosity of from 2.5 to 100 cS at application temperature, and is compatible with the thermoplastic polymer to be reinforced.

Such a process is also referred to as a wire coating process, where a glass multifilament strand (i.e. the wire) is provided with a sheath (i.e. coated). According to WO 2009/080281, the sheathed continuous glass multifilament strand may be cut into pellets having a length of from 2 to 50 mm, preferably from 5 to 30 mm, more preferably from 6 to 20 mm and most preferably from 10 to 15 mm.

The pellets can be used directly in a downstream conversion process such as injection moulding. To allow a proper dispersion of the glass fibres in such downstream conversion processes the core of the pellets not only contains the glass fibres but also what is referred to as the impregnating agent. The impregnating agent facilitates a proper dispersion of the glass fibres during the moulding of the (semi) finished article. The impregnating agent is an important component of these long glass fibre reinforced polyolefin materials.

First of all, if the dispersion of the glass fibres in the downstream process is insufficient this will result in agglomerates of glass fibres in the end product, resulting in a poor visible appearance, so called "white spots", and possibly even loss or reduction of mechanical properties.

Secondly, if the impregnating agent does not sufficiently couple the glass fibres to each other and to the polyolefin sheath then, upon subjecting the pellets to repetitive mechanical loads, glass fibres may separate from the pellets. Such repetitive mechanical loads may occur for example during transport of the pellets through a piping system. Separation of glass fibres from the pellets during transport through a piping system is undesirable because the separated filaments may cause blocking of the piping system and/or of filters, valves, outlets and the like that are used in the piping system. Such blocking may result in down time of the equipment and possible loss of production capacity. The problem of glass fibres separating from the pellet is often referred to as the "free glass" problem. So in effect the impregnating agent has at least two key functions, the first one being to effectively couple the glass fibres to each other and to the polyolefin sheath in the pellet and the second one being to provide a sufficient dispersion of the glass fibres in downstream conversion processes. The term "multifilament strand" as used in WO2009/080821 and the term "multifibre strand" or "continuous multifibre strand" as used herein should be regarded as synonyms and referring to the same type of material, which, in case of glass, are often also referred to as roving or glass roving.

Another process to manufacture long glass fibre reinforced polypropylene materials is based on what is known as a pultrusion process. In such a process continuous glass multifibre strands are pulled through a molten resin in such a manner that the individual filaments are fully dispersed into said resin. Examples of such processes are disclosed in EP1364760, NL1010646 and WO 2008/089963.

An important difference between pellets of pultrusion grade long glass fibre reinforced polypropylene and pellets of the long glass fibre reinforced polypropylene according to the present invention is that the glass fibres in the present invention are not dispersed in the polypropylene. This dispersion will only take place once the pellets are moulded into finished or semi-finished parts in downstream conversion processes.

An important difference between the pultrusion process and the wire coating or sheathing process of WO2009/080821 is that the pultrusion process can only run at a relatively low speed, such as in the order of 30 m/min. To the contrary the wire coating process can run at line speeds of at least 100 m/min or even at least 300 m/min.

In view of the differences between the wire-coating process and the pultrusion process the typical problems of "free glass" and "white spots" do not occur in pultrusion based pellets.

Long glass fibre reinforced polypropylene compositions are typically used in the automotive industry for both internal parts such as instrument panels, as well as for external parts such as bumper fascia. However, they have not been used for producing a bicycle frame.

Properties of Composition

Preferably, the composition has a tensile modulus determined according to ISO527/1A of at least 4000 N/mm$^2$, at least 5500 N/mm$^2$, at least 7000 N/mm$^2$, or at least 9000 N/mm$^2$.

Preferably, the composition has a tensile strength determined according to ISO527/1A of at least 70 N/mm$^2$, at least 90 N/mm$^2$, at least 108 N/mm$^2$ or at least 113 N/mm$^2$.

Preferably, the composition has a tensile elongation at break according to ISO527/1A of at least 1.5%, at least 2.0%, at least 2.2% or at least 2.4%.

Preferably, the composition has a flexural modulus determined according to ISO 178 of at least 4000 N/mm$^2$, at least 5500 N/mm$^2$ or at least 7000 N/mm$^2$.

Preferably, the composition has a flexural strength determined according to ISO 178 of at least 120 N/m$^2$, at least 140 N/m$^2$ or at least 170 N/mm$^2$.

Preferably, the composition has a Charpy impact notched strength according to ISO 179/1eA of at least 12 kJ/m$^2$, at least 15 kJ/m$^2$, at least 21 kJ/m$^2$ or at least 24 kJ/m$^2$.

Preferably, the composition has a Charpy impact unnotched strength according to ISO 179/1eA of at least 35 kJ/m$^2$, at least 45 kJ/m$^2$, at least 53 kJ/m$^2$ or at least 58 kJ/m$^2$.

A combination of high stiffness and high impact strength of the composition makes the composition particularly suitable for making a bicycle frame.

In some preferred embodiments, the composition has a tensile modulus determined according to ISO527/1A of at least 4000 N/mm$^2$, a tensile strength determined according to ISO527/1A of at least 70 N/m$^2$, a tensile elongation at break according to ISO527/1A of at least 1.5%, a flexural modulus determined according to ISO 178 of at least 4000 N/mm$^2$, a flexural strength determined according to ISO 178 of at least 120 N/mm$^2$, a Charpy impact notched strength according to ISO 179/1eA of at least 12 kJ/m$^2$ and a Charpy impact unnotched strength according to ISO 179/1eA of at least 35 kJ/m$^2$.

In some preferred embodiments, the composition has a tensile modulus determined according to ISO527/1A of at least 7000 N/mm$^2$, a tensile strength determined according to ISO527/1A of at least 108 N/mm$^2$, a tensile elongation at break according to ISO527/1A of at least 2.0%, a flexural modulus determined according to ISO 178 of at least 7000 N/mm$^2$, a flexural strength determined according to ISO 178 of at least 170 N/mm$^2$, a Charpy impact notched strength according to ISO 179/1eA of at least 24 kJ/m$^2$ and a Charpy impact unnotched strength according to ISO 179/1eA of at least 53 kJ/m$^2$.

Polypropylene

The polypropylene of the sheath can be a propylene homopolymer, a propylene—alpha olefin copolymer, such as a propylene—ethylene random copolymer, an impact propylene copolymer, sometimes referred to as a heterophasic propylene copolymers, or a propylene block-copolymers. Mixtures of more than one polypropylene are also possible. It is preferred to use either a polypropylene homopolymer for obtaining a higher stiffness of the composition.

The propylene may contain additives, typically up to 5 wt % of the polypropylene. The additives may include one or more of nucleating agents; clarifiers; stabilisers, e.g. heat stabilisers, anti-oxidants, UV stabilizers; colorants, like pigments and dyes; surface tension modifiers; lubricants; flame-retardants; mould-release agents; flow improving agents; plasticizers; anti-static agents.

The polypropylene typically has a melt flow rate (MFR) that is significantly lower as compared to polypropylene used in pultrusion processes. As such the MFR of the polypropylene may be from 5-100 g/10 min, preferably from 10-100 g/10 min, preferably from 10 to 80 g/10 min, more preferably from 20-80 g/10 min or more preferably from 10 to 50 g/10 min as measured in accordance with ISO 1133-1:2011 (2.16 kg, 230° C.). In an embodiment the polypropylene having a relatively low MFR such as from 5-50 g/10 min is used. Low MFR materials intrinsically have improved mechanical properties over high MFR polypropylene materials.

The polypropylene has a flexural modulus determined according to ASTM D790A of at least 1000 N/mm$^2$, preferably at least 1200 N/mm$^2$, for example at least 1300 N/mm$^2$, more preferably at least 1500 N/mm$^2$, more preferably at least 1700 N/mm$^2$.

Preferably, the polypropylene has a tensile strength determined according to ASTM D638-10 based on injection molded specimens of at least 20 MPa, more preferably at least 25 MPa, more preferably at least 30 MPa.

Preferably, the polypropylene has a tensile elongation at yield determined according to ISO 527-1/-2 of at least 5%, more preferably at least 8%, preferably at least 10%.

Preferably, the polypropylene has a notched Izod impact strength as determined according to ASTM D256-10 at 23° C. of at least 10 J/m, more preferably at least 15 J/m.

In some preferred embodiments, the polypropylene has a flexural modulus determined according to ASTM D790A of at least 1000 N/mm$^2$, preferably of at least 1200 N/mm$^2$, a tensile strength determined according to ASTM D638 of at least 20 MPa, a tensile elongation at yield determined according to ISO 527-1/-2 of at least 5% and a notched Izod impact strength at 23° C. of at least 10 J/m, more preferably at least 15 J/m.

The combination of high stiffness and high impact strength of the polypropylene in the composition makes the composition particularly suitable for making a bicycle frame.

Glass Fibres

The long glass fibre reinforced polypropylene composition of the present invention contains from 10 to 70 wt. % of glass fibres, preferably 30 to 50 wt %, based on the total weight of the composition.

The glass fibres used in the present invention typically have a diameter in the range of from 5 to 50 micrometer, preferably from 10 to 30 micrometer such as from 15 to 25 micrometer. A thinner glass fibre generally leads to higher aspect ratio (length over diameter ratio) of the glass fibres in the final product prepared from the glass fibre reinforced composition, yet thinner glass fibres may be more difficult to manufacture and/or handle. In the method according to the present invention it is preferred that the glass fibres originate from glass multifibre strands, also referred to as glass rovings.

Preferably, the glass multifibre strand(s) or rovings contain from 500 to 10000 glass filaments per strand, more preferably from 2000 to 5000 glass filaments per strand.

The linear density of the glass multifibre strand preferably is from 1000 to 5000 tex, corresponding to 1000 to 5000 grams per 1000 meter. Preferably the linear density is from 1000-3000 tex. Usually the glass fibres are circular in cross section meaning the thickness as defined above would mean diameter. Rovings are generally available and well known to the skilled person. Examples of suitable rovings are the Advantex products designated for example as SE4220, SE4230 or SE4535 and available from Binani 3B Fibre Glass company, available as 1200 or 2400 tex, or TUFRov 4575, TUFRov 4588 available from PPG Fibre Glass. Most preferably rovings are used having a linear density of 3000 tex. These commercially available rovings contain glass fibres having a small amount of sizing composition applied thereon; typically the amount of such sizing is less than 2 wt. % based on the weight of the fibers.

Pellets

The pellets of the composition according to the present invention have a length of at least 1 mm, preferably at least 2 mm or at least 3 mm. The pellets of the composition according to the present invention preferably have a length of from 5 to 40 mm such as from 8 to 20 mm and preferably from 10 to 18 mm. The skilled person will understand that pellets preferably are substantially cylindrical with a circular cross section, yet other cross sectional shapes, like for example oval or (rounded) square also fall within the scope of the present invention.

In the pellets, the glass fibres generally extend in the longitudinal direction as a result of which they lie substantially in parallel to one another. The glass fibres extending in a longitudinal direction have a length of between 95% and 105%, more in particular between 99% and 101% of the length of a pellet. Ideally the length of the fibres is substantially the same as the length of the pellet, yet due to some misalignment, twisting, or process inaccuracies the length may vary within the aforementioned range. For example the length of the glass fibers is in the range from 4.75 to 42.0 mm, preferably in the range from 9.50 to 18.90 mm, more preferably in the range from 9.90 to 18.18 mm.

The pellets have a core-sheath structure wherein the core contains the glass fibres and the sheath is comprised of the polypropylene. The core does not contain polypropylene.

The pellets can be manufactured with the wire-coating process according to WO2009/080821 as already explained.

Impregnating Agent

The long glass fibre reinforced polypropylene composition of the present invention preferably contains an impregnating agent. The amount of impregnating agent may vary and is preferably from 0.5 to 7 wt. % based on the total weight of the long glass fibre reinforced polypropylene composition. The amount of impregnating agent may also be expressed relative to the weight of the glass fibres. Preferably the amount of impregnating agent is from 5 to 15 wt. %, more preferably from 7 to 15 wt. % based on the weight of glass fibres.

The presence of an impregnating agent allows a good dispersion of the glass fibres within the polypropylene composition during the downstream injection moulding. In addition to that the impregnating agent also couples the glass fibres to each other and to the sheath to a certain extent. It is preferred to use an impregnating agent as defined in WO 2009/080821. That is, the impregnating agent is non-volatile, has a melting point of at least about 20° C. below the melting point of the polypropylene sheath and has a viscosity of from 2.5 to 100 cS at application temperature. The viscosity of the impregnating agent is lower than 100 cS, preferably lower than 75 cS and more preferably lower than 25 cS at application temperature. The viscosity of the impregnating agent is higher than 2.5 cS, preferably higher than 5 cS, and more preferably higher than 7 cS at the application temperature. An impregnating agent having a viscosity higher than 100 cS is difficult to apply to the continuous strand of glass fibres. Low viscosity is needed to facilitate good wetting performance of the glass fibres, but an impregnating agent having a viscosity lower than 2.5 cS is difficult to handle, e.g., the amount to be applied is difficult to control. The melting temperature of the impregnating agent is at least about 20° C., preferably at least 25° C. or at least 30° C. below the melting point of the polypropylene composition sheath. The application temperature of the impregnating agent is selected such that the desired viscosity range is obtained. The amount of impregnating agent that is applied depends inter alia on the thermoplastic polymer used for the sheath, the amount of glass fibres, the size (diameter) of the glass fibres of the continuous strand, and on the type of sizing that is on the surface of the glass fibres.

According to the present invention, the amount of impregnating agent applied to the continuous strand of glass fibres should be higher than 0.5 wt. %, preferably higher than 2 wt. %, more preferably higher than 4 wt. %, more preferably higher than 6.wt % based on the weight of the glass fibres (including the sizing composition). The amount of impregnating agent should be lower than 20 wt. % preferably lower than 18 wt. %, more preferably lower than 15 wt. % more preferably lower than 12 wt. %. In general, a higher amount of glass fibres requires a higher amount of impregnating agent. A certain minimum amount of impregnating agent is desired to assist homogeneous dispersion of glass fibres in the thermoplastic polymer matrix during moulding. An excess of impregnating agent may result in decrease of mechanical properties of the moulded articles.

Suitable examples of impregnating agents for use in combination with polypropylene as the material for the sheath may comprise highly branched poly(alpha-olefins), such as polyethylene waxes, modified low molecular weight polypropylenes, mineral oils, such as, paraffin or silicon and any mixtures of these.

Preferably, the impregnating agent comprises a highly branched poly(alpha-olefin) and, more preferably, the impregnating agent is a highly branched polyethylene wax. The wax may optionally be mixed with a hydrocarbon oil or wax like a paraffin oil to reach the desired viscosity. WO 2009/080281 discloses as an impregnating agent a blend of 30 wt. % Vybar 260 (hyper branched polymer supplied by Baker Petrolite) and 70 wt % Paralux oil (paraffin, supplied by Chevron). The term non-volatile means that the impregnating agent does not evaporate under the application and processing conditions applied. In the context of the present invention, "substantially solvent-free" means that the impregnating agent contains less than 10% by mass of solvent, preferably less than 5% by mass solvent. Most preferably, the impregnating agent does not contain any solvent. The impregnating agent may further be mixed with other additives known in the art.

In a more preferred embodiment the impregnating agent contains at least 70 wt. % of microcrystalline wax based on the weight of the impregnating agent. In that respect it is to be understood that the microcrystalline wax may be a single microcrystalline wax or a blend of several microcrystalline waxes. Microcrystalline waxes are known materials. In general a microcrystalline wax is a refined mixture of solid saturated aliphatic hydrocarbons, and produced by de-oiling certain fractions from the petroleum refining process. Microcrystalline waxes differ from refined paraffin wax in that the molecular structure is more branched and the hydrocarbon chains are longer (higher molecular weight). As a result the crystal structure of microcrystalline wax is much finer than paraffin wax, which directly impacts many of the mechanical properties of such materials. Microcrystalline waxes are tougher, more flexible and generally higher in melting point compared to paraffin wax. The fine crystalline structure also enables microcrystalline wax to bind solvents or oil and thus prevents the sweating out of compositions. Microcrystalline wax may be used to modify the crystalline properties of paraffin wax. Microcrystalline waxes are also very different from so called iso-polymers. First of all, microcrystalline waxes are petroleum based whereas iso-polymers are poly-alpha-olefins. Secondly iso-polymers have a very high degree of branching of above 95%, whereas the amount of branching for microcrystalline waxes generally lies in the range of from 40-80 wt. %. Finally, the melting point of iso-polymers generally is relatively low compared to the melting temperature of microcrystalline waxes. All in all, microcrystalline waxes form a distinct class of materials not to be confused either by paraffin or by iso-polymers. The remaining at most 30 wt % of impregnating agent may contain a natural or synthetic wax or an iso-polymer. Typical natural waxes are animal waxes such as bees wax, lanolin and tallow, vegetable waxes such as carnauba, candelilla, soy, mineral waxes such as paraffin, ceresin and montan. Typical synthetic waxes include ethylenic polymers such as polyethylene wax or polyol ether-ester waxes, chlorinated naphtalenes and Fisher Tropsch derived waxes. A typical example of an iso-polymer, or hyper-branched polymer, is Vybar 260 mentioned above. In an embodiment the remaining part of the impregnating agent contains or consists of one or more of a highly branched poly-alpha-olefin, such as a polyethylene wax, paraffin. In a further preferred embodiment the impregnating agent comprises at least 80 wt %, more preferably at least 90 wt % or even at least 95 wt % or at least 99 wt % of microcrystalline wax. It is most preferred that the impregnating agent substantially consists of microcrystalline wax. In an embodiment the impregnating agent does not contain paraffin. The term substantially consists of is to be interpreted such that the impregnating agent comprises at least 99.9 wt. % of microcrystalline wax, based on the weight of the impregnating agent.

The microcrystalline wax preferably has one or more of the following properties:
  a drop melting point of from 60 to 90° C. as determined in accordance with ASTM D127;
  congealing point of from 55 to 90° C. as determined in accordance with ASTM D938;
  a needle penetration at 25° C. of from 7 to 40 tenths of a mm as determined in accordance with ASTM D1321;
  a viscosity at 100° C. of from 10 to 25 mPa·s as determined in accordance with ASTM D445;
  an oil content of from 0 to 5 wt. % preferably from 0 to 2 wt % based on the weight of the microcrystalline wax as determined in accordance with ASTM D721.

In an even more preferred embodiment the microcrystalline wax has all these properties in combination.

The skilled person will understand that the core of the pellet comprising the glass fibres and the impregnating agent will only be surrounded by the polypropylene sheath in the longitudinal direction. Hence, the core of the pellet is exposed to the surrounding at the two cutting planes, or cross sectional surfaces corresponding to the positions where the pellet was cut. It is for this reason that upon insufficient coupling of the glass fibres to the sheath the glass fibres may separate from the pellet resulting in free glass as explained above.

The examples of compositions used in the present invention include SABIC® STAMAX 20YM243, 30YM243, 40YM243, 50YM240 and 60YM240.

Method

The present invention is further directed to a method for the manufacture of the bicycle frame according to the invention, said method comprising the steps of
  a) providing at least one continuous glass multifibre strand,
  b) optionally applying an impregnating agent to said continuous glass multifibre strand,
  c) applying a sheath of polypropylene around the strand obtained in step b) so as to form a sheathed continuous multifibre strand,
  d) cutting the sheathed continuous multifibre strand so as to form the pellets and
  e) injection moulding the pellets to obtain the bicycle frame.

Steps a)-c) are typically known as a wire-coating process. Wire-coating is carried out by passing the continuous glass multifibre strand (roving) through a wire-coating die. Said die is attached to an extruder which supplies molten polypropylene composition through an opening substantially perpendicular to the direction of the glass multifibre strand through the die. As such the thermoplastic polymer basically sheaths or encapsulates the glass multifibre strand which is the "wire" to be "coated". Such a process is also disclosed in WO 99/00543 and in WO 2009/080281, the essential difference between these disclosures being that WO 99/00543 does not require the application of impregnating agent prior to the sheathing with the thermoplastic polyolefin. In the process of the invention it is preferred that either one continuous glass multifibre strand is sheathed or two continuous glass multifibre strands are sheathed together. The latter being in particular of relevance form compositions having a relatively high amount of glass fibres, such as from 40-70 wt. % or 50-70 wt. %. Although less preferred, instead of applying the impregnating agent "in line", use may also be made of rovings that already contain said impregnating agent.

The line speed of the process may be at least 100 m/min or at least 200 m/min or at least 300 m/min or at least 400 m/min. Generally the line speed may be from 100-600 m/min provided the cooling capacity of the production line is sufficient for cooling the sheathed strand to the desired cutting temperature.

Preferably the method for the manufacture of the bicycle frame comprises a step of injection moulding pellets of a long glass fibre reinforced polypropylene composition having a core containing glass fibres and an impregnating agent and a sheath of polypropylene surrounding said core,
  wherein the pellets have an average length of at least 1 mm,
  the amount of the glass fibers is 10 to 70 wt % with respect to the composition and the polypropylene has a flexural modulus determined according to ASTM D790A of at least 1000 N/mm$^2$, wherein preferably the long glass fibre reinforced polypropylene composition is the long glass fibre reinforced polypropylene composition according to the invention.

Preferably, the bicycle frame according to the invention passes the tests of ISO4210-6:2014, 4.1 to 4.5.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

EXAMPLES

A computer simulation was performed on whether a long glass fibre reinforced polypropylene composition SABIC® STAMAX 40YM243 passes the tests 4.1 to 4.5 of ISO4210-6:2014. The results were pass for all of 4.1 to 4.5 of ISO4210-6:2014.

Table 1 shows the various mechanical properties of various long glass fibre reinforced polypropylene compositions.

Polypropylene SABIC® STAMAX 20YM243, 30YM243, 40YM243 and 50YM240 comprises a polypropylene homopolymer having the following properties shown in Table 2.

TABLE 2

| PROPERTIES | | UNITS | TEST METHODS |
|---|---|---|---|
| POLYMER PROPERTIES | | | |
| Melt Flow Rate at 230° C. and 2.16 kg | 47 | dg/min | ISO 1133-1:2011 |
| Density at 23° C. | 905 | kg/m$^3$ | ASTM D1505 |
| MECHANICAL PROPERTIES | | | |
| Tensile Strength at Yield [1] | 35 | Mpa | ASTM D638 |
| Tensile Elongation at Yield | 11 | % | ISO 527-1/-2 |
| Flexural Modulus (1% Secant) | 1800 | MPa | ASTM D790 A |
| Notched Izod Impact Strength at 23° C. | 20 | J/m | ASTM D256-10 |

[1] Based on injection molded specimens

The invention claimed is:

1. A bicycle frame made by injection molding pellets of a glass fibre reinforced polypropylene composition having a core containing glass fibres and an impregnating agent and a sheath of polypropylene surrounding said core,
   wherein the pellets have an average length of at least 1 mm,
   the amount of the glass fibres is 10 to 70 wt % with respect to the composition,
   wherein the impregnating agent comprises at least one of branched poly(alpha-olefin) or a mineral oil, and
   the polypropylene has a flexural modulus determined according to ASTM D790A of at least 1000 N/mm$^2$.

2. The bicycle frame according to claim 1, wherein the amount of the polypropylene in the composition is 25 to 80 wt % with respect to the composition, the amount of the glass fibres is 10 to 70 wt % with respect to the composition and the amount of the impregnating agent is 5 to 15 wt % with respect to the glass fibres.

3. The bicycle frame according to claim 1, wherein the polypropylene has a melt flow rate measured in accordance with ISO 1133-1:2011 (2.16 kg, 230° C.) of 10 to 100 g/10 min.

TABLE 1

| | | | 20YM243 | 30YM243 | 40YM243 | 50YM240 |
|---|---|---|---|---|---|---|
| Glass fibre content | % | ISO 3451 | 20 | 30 | 40 | 50 |
| Tensile Modulus | N/mm$^2$ | ISO 527/1A | 4600 | 6600 | 8200 | 10500 |
| Tensile Strength | N/mm$^2$ | ISO 527/1A | 80 | 105 | 110 | 115 |
| Tensile Elongation at break | % | ISO 527/1A | 2.5 | 2.3 | 2.1 | 1.9 |
| Flexural Modulus | N/mm$^2$ | ISO 178 | 4600 | 6400 | 8700 | |
| Flexural strength | N/mm$^2$ | ISO 178 | 130 | 160 | 180 | |
| Charpy impact notched | kJ/m$^2$ | ISO 179/1eA | 14 | 20 | 26 | 22 |
| Charpy impact unnotched | kJ/m$^2$ | ISO 179/1eU | 40 | 60 | 55 | 50 |

4. The bicycle frame according to claim 1, wherein the amount of the glass fibres is 30 to 50 wt % with respect to the composition.

5. The bicycle frame according to claim 1, wherein pellets have a length of 5 to 40 mm.

6. The bicycle frame according to claim 1, wherein the polypropylene has a flexural modulus determined according to ASTM D790A of at least 1200 N/mm².

7. The bicycle frame according to claim 1, wherein the polypropylene has a tensile strength determined according to ASTM D638-10 based on injection molded specimens of at least 20 MPa.

8. The bicycle frame according to claim 1, wherein the polypropylene has a tensile elongation at yield determined according to ISO 527-1/-2 of at least 5%.

9. The bicycle frame according to claim 1, wherein the polypropylene has a notched Izod impact strength determined according to ASTM D256-10 at 23° C. of at least 10 J/m.

10. The bicycle frame according to claim 1, wherein the composition has a tensile modulus determined according to ISO527/1A of at least 4000 N/mm².

11. The bicycle frame according to claim 1, wherein the composition has a tensile strength determined according to ISO527/1A of at least 70 N/mm².

12. The bicycle frame according to claim 1, wherein the composition has a tensile elongation at break according to ISO527/1A of at least 1.5%.

13. The bicycle frame according to claim 1, wherein the composition has a flexural modulus determined according to ISO 178 of at least 4000 N/mm² and/or a flexural strength determined according to ISO 178 of at least 120 N/mm².

14. The bicycle frame according to claim 1, wherein the composition has a Charpy impact notched strength according to ISO 179/1eA of at least 12 kJ/m² and/or a Charpy impact unnotched strength according to ISO 179/1eA of at least 35 kJ/m².

15. A method for the manufacture of the bicycle frame according to claim 1, said method comprising the steps of
   a) providing at least one continuous glass multifibre strand,
   b) applying an impregnating agent to said continuous glass multifibre strand,
   c) applying a sheath of polypropylene around the strand obtained in step b) so as to form a sheathed continuous multifibre strand,
   d) cutting the sheathed continuous multifibre strand so as to form the pellets and
   e) injection moulding the pellets to obtain the bicycle frame.

16. The bicycle frame according to claim 1, wherein the impregnating agent comprises a microcrystalline wax.

17. The bicycle frame according to claim 1, wherein the impregnating agent is present in an amount of 7 to 15 wt % with respect to the glass fibres.

* * * * *